Apr. 3, 1923.
D. L. DAVIS
1,450,581
HEADLIGHT
Filed Mar. 17, 1922
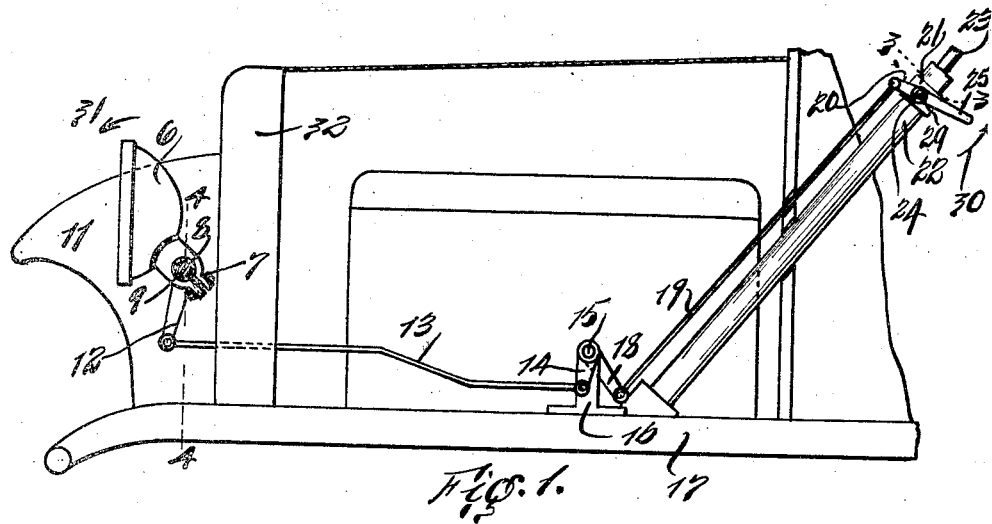
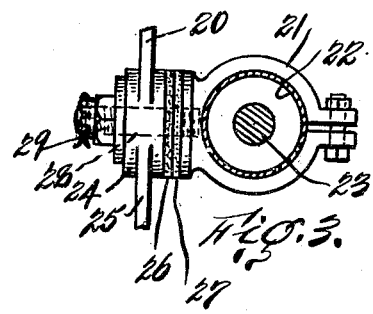
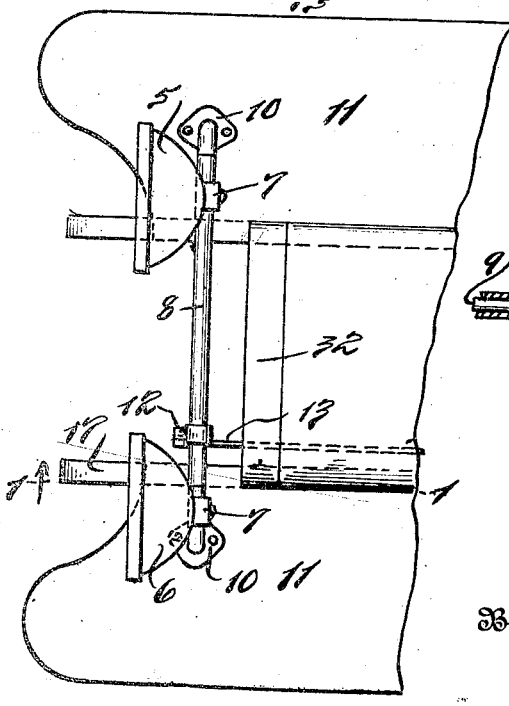
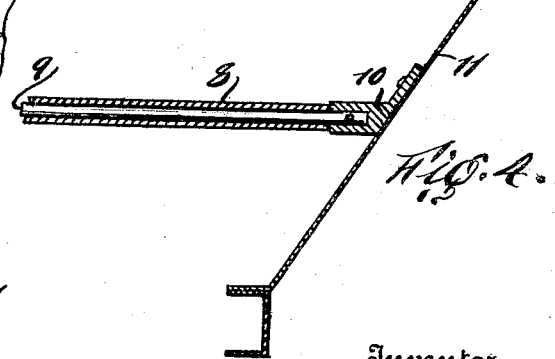
Inventor
David L. Davis
By his Attorney
Maurice Block Patented Apr. 3, 1923.

1,450,581

UNITED STATES PATENT OFFICE.

DAVID L. DAVIS, OF NORWALK, CONNECTICUT.

HEADLIGHT.

Application filed March 17, 1922. Serial No. 544,459.

*To all whom it may concern:*

Be it known that I, DAVID L. DAVIS, a resident of Norwalk, Fairfield County, State of Connecticut, and a citizen of the United States of America, have invented certain new and useful Improvements in Headlights, of which the following is a specification.

This invention relates to improvements in headlight devices for automobiles, one of the objects being to provide a headlight structure arranged so that the headlights can be tilted downwardly, at the will of the driver, in order to take the glare out of the eyes of the driver of an approaching vehicle, or for any other reason. My improved device avoids the use of dimming devices which at their best do not produce sufficient light for safe driving. As my improved device avoids the use of dimming devices, the driver has plenty of light to see the road when the lights are tilted, at the same time taking the glare out of the danger zone for an oncoming car or other vehicle.

I will now proceed to describe my invention in detail, the novel features of which I will point out in the appended claim, reference being had to the accompanying drawing, wherein:—

Fig. 1 is a sectional view, illustrating my improved device applied to an automobile, the section being taken on a line 1—1, in Fig. 2;

Fig. 2 is a fragmentary top plan view;

Fig. 3 is an enlarged sectional detail view, the section being taken on a line 3—3 in Fig. 1; and Fig. 4 is a similar view, the section being taken on a line 4—4 in Fig. 1.

My improved device is comprised of a pair of lamp casings 5 and 6 adjustably clamped as at 7 to a tubular carrier 8 rotatably supported by a cross rod 9 which in turn is supported at each end by a bracket 10. Each bracket 10 is fastened to an adjacent fender 11. The tubular support 8 carries an arm 12 which is connected by a link 13 to an arm 14 carried by a stub-shaft 15 mounted in a bracket 16 carried by the frame member 17 of the vehicle. The shaft 15 also carries an arm 18 connected by a link 19 to an arm 20 pivotally supported by a bracket 21 carried by the housing 22 for the steering post 23. The hub 24 of arm 20 carries a handle 25. The inner end of hub 24 is faced with a disk 26 of leather, fibre or the like, bearing against a similar disk 27 carried by the bracket 21. The hub 24 is rocked upon a stud 28 carrying a take-up-nut 29 by which means the two disks can be caused to contact with greater or less pressure. The disks 26 and 27 are designed to hold the arm 20 in adjusted positions. When handle 25 is moved in the direction of the arrow 30, the lamp casings will be tilted in the direction of the arrow 31, thereby causing the rays of light to be cast down upon the road, whereby glare will be taken out of the face of the driver of an approaching vehicle. The disks 26 and 27 will hold the lamp casing in such tilted position until the handle 25 is manipulated to raise the lamps to normal position. The disks 26 and 27 will hold the lamps in any tilted position. The link 13 will be passed through the grid portion of the radiator 32.

What I desire to secure by Letters Patent is:—

In combination with a motor vehicle having fenders, a rod extending transversely of the vehicle, means to secure said rod at each end to an adjacent fender, a carrier rotatably supported by said rod, a pair of lamp-casings carried by the rod, means whereby the lamp-casings may be adjusted relatively to said rod, a bracket carried by the steering post of the vehicle, a handle movably supported by said bracket and adapted, when manipulated, to further adjust said lamp casings, friction disks interposed between the handle and the bracket therefor, arranged to hold the handle in adjusted positions, and means to vary the pressure of one disk against the other.

DAVID L. DAVIS.